United States Patent [19]

Kowalski

[11] Patent Number: 5,318,696

[45] Date of Patent: Jun. 7, 1994

[54] CATALYTIC CONVERSION WITH IMPROVED CATALYST CATALYTIC CRACKING WITH A CATALYST COMPRISING A LARGE-PORE MOLECULAR SIEVE COMPONENT AND A ZSM-5 COMPONENT

[75] Inventor: Jocelyn A. Kowalski, Clarksboro, N.J.

[73] Assignee: Mobil Oil Corporation, Fairfax, Va.

[21] Appl. No.: 988,993

[22] Filed: Dec. 11, 1992

[51] Int. Cl.$^5$ .............................................. C10G 11/05
[52] U.S. Cl. .................................. 208/120; 208/113; 208/114
[58] Field of Search ......... 208/113, 114, 120, 120 MC

[56] References Cited

U.S. PATENT DOCUMENTS

| | | | |
|---|---|---|---|
| 3,758,403 | 9/1973 | Rosinski et al. | 208/120 |
| 3,847,793 | 11/1974 | Schwartz et al. | 208/70 |
| 4,309,280 | 1/1982 | Rosinski et al. | 208/120 |
| 4,356,338 | 10/1982 | Young | 208/114 |
| 4,927,523 | 5/1990 | Donnelly | 208/152 |
| 4,980,053 | 12/1990 | Li et al. | 208/120 |
| 4,994,424 | 2/1991 | Leib et al. | 502/41 |
| 5,110,776 | 5/1992 | Chitnis et al. | 502/64 |
| 5,126,298 | 6/1992 | Absil et al. | 502/68 |

FOREIGN PATENT DOCUMENTS 8400167  5/1984  Netherlands .

*Primary Examiner*—R. Bruce Breneman
*Assistant Examiner*—Walter D. Griffin
*Attorney, Agent, or Firm*—Alexander J. McKillop; Malcolm D. Keen; Richard D. Stone

[57] ABSTRACT

A process is provided for converting feedstock hydrocarbon compounds over a catalyst composition which comprises a large-pore molecular sieve material and an additive catalyst composition comprising crystalline material having the structure of ZSM-5 and a silica/alumina mole ratio of less than about 30. An embodiment of the present invention comprises an improved catalytic cracking process to produce high octane gasoline, increased alkylate and potential alkylate, and increased lower olefins, especially propylene.

22 Claims, No Drawings

CATALYTIC CONVERSION WITH IMPROVED CATALYST CATALYTIC CRACKING WITH A CATALYST COMPRISING A LARGE-PORE MOLECULAR SIEVE COMPONENT AND A ZSM-5 COMPONENT

FIELD OF THE INVENTION

The present invention relates to a process for converting, e.g., cracking, a hydrocarbon feed over a particular catalyst combination to produce conversion product, e.g., a high octane gasoline fraction, more alkylate and gasoline plus potential alkylate, and, most significantly, substantially more lower olefins, especially propylene, when compared to prior art processes. The catalyst combination for use herein includes an additive catalyst comprising molecular sieve material having the structure of ZSM-5. The particular ZSM-5 structure used is synthesized by a method which provides crystals having high activity, propylene selectivity, and improved processing and handling characteristics for the present process.

BACKGROUND OF THE INVENTION

There is a growing need for higher octane in the refinery gasoline pool, particularly since the phase-out of lead additives for gasoline both in the U.S. and abroad. Decreases in octane sensitivity, i.e., the difference between research and motor octane, are especially desirable. Increased alkylate and potential alkylate are also needed from today's gasoline manufacturing processes. Some $C_3$ and $C_4$ olefins are useful by-products of such a manufacturing process; increases in these olefins are desired. These light olefins are used to make ethers and/or alcohols.

Most options available to FCC operators have limited potential. Use of shape-selective cracking additives, or large-pore cracking catalyst containing such additives, appeared to have only limited potential to increase yields of light olefins.

Pyrolysis units or thermal crackers produce large amounts of olefins, but little gasoline. A high severity, shape-selective cracking process is also available. However, like the closely related pyrolysis process, the high severity process makes large amounts of olefins and relatively small yields of highly aromatic, low octane gasoline.

In efforts to solve these problems, a number of processes have been developed. For example, U.S. Pat. No. 3,758,403 teaches the benefits of adding ZSM-5 to conventional large-pore cracking catalyst formulations. Example 2 of the patent uses a catalyst consisting of 5 wt. % ZSM-5, 10 wt. % REY, and 85% clay. With a gas oil feedstock, the catalyst produced 11.42 vol. % propylene, and a total yield of alkylate and $C_5+$ gasoline of 89.1 vol. %. Example 3 of the patent uses a catalyst consisting of 10 wt. % ZSM-5, 10 wt. % REY, and 80% clay. Although the ZSM-5 content doubled, propylene yields increased from 11.4 vol. % to only 13.6 vol. %. The total yield of alkylate and gasoline declined slightly, from 89.1 vol. % to 88.6 vol. %.

U.S. Pat. No. 3,847,793 teaches a slightly different approach. The ZSM-5, which could be in the same particle with the large-pore zeolite, or in a separate additive, is used to convert olefins to aromatics. A riser reactor with an enlarged upper portion is used, along with injection of a coking fluid near the top of the riser, to deactivate the large-pore catalyst while leaving the ZSM-5 catalyst active. Gasoline boiling range material could be injected into the top of the riser for conversion. Table 2 of the patent shows that this approach reduced the mono-olefin content of an FCC gasoline from 14.0 wt. % to 2.9 wt. %. The discussion of Example 2 reports that ZSM-5 was effective for converting propylene to aromatics over a wide range of catalyst silica/alumina ratios.

Based on U.S. Pat. No. 3,847,793, large amounts of ZSM-5 should efficiently convert propylene into aromatics. This would reduce light olefin production, and perhaps exacerbate problems of producing gasoline without exceeding aromatics and/or benzene specifications.

Based on U.S. Pat. No. 3,758,403, use of large-pore cracking catalyst with large amounts of ZSM-5 additive gives only modest increase in light olefin production. A 100% increase in ZSM-5 content (from 5 wt. % ZSM-5 to 10 wt. % ZSM-5) increased the propylene yield less than 20%, and decreased slightly the potential gasoline yield ($C_5+$ gasoline plus alkylate).

Because refiners must retain the ability to use the many types of commercially available large-pore cracking catalysts available today, the normal practice is to use additive catalysts, with 10 to 50 wt. %, more usually 10 to 25 wt. % ZSM-5 in an amorphous support, to their FCC units. Such additives have physical properties which allow them to circulate with the large-pore cracking catalyst.

U.S. Pat. No. 4,309,280 teaches adding very small amounts of powdered, neat ZSM-5 catalyst, characterized by a particle size below 5 microns. Adding as little as 0.25 wt. % ZSM-5 powder to the FCC catalyst inventory increased LPG production 50%. Small amounts of neat powder behaved much like larger amounts of ZSM-5 disposed in larger particles.

A way to add a modest amount of ZSM-5 to an FCC unit is disclosed in U.S. Pat. No. 4,994,424, incorporated herein by reference. ZSM-5 additive is added to the equilibrium catalyst in a programmed manner so an immediate boost in octane number, typically ½-2 octane number, is achieved.

U.S. Pat. No. 4,927,523, incorporated herein by reference, teaches a way to add large amounts of ZSM-5 to a unit without exceeding wet gas compressor limits. Large amounts are added and cracking severity is reduced in the FCC unit for several days.

Recent work on ZSM-5 additives has been directed at stabilizing the additives with phosphorus or making them more attrition resistant. Phosphorus stabilized ZSM-5 additive is believed to retain activity for a longer time. Phosphorus stabilization thus reduces the makeup rate of ZSM-5 additive required. U.S. Pat. No. 5,110,776 teaches a method for preparing FCC catalyst comprising modifying the zeolite, e.g., ZSM-5, with phosphorus. U.S. Pat. No. 5,126,298 teaches manufacture of an FCC catalyst comprising zeolite, e.g., ZSM-5, clay, and phosphorus. Phosphorus treatment has been used on faujasite-based cracking catalysts for metals passivation (see U.S. Pat. Nos. 4,970,183 and 4,430,199); reducing coke make (see U.S. Pat. Nos. 4,567,152; 4,584,091; and 5,082,815); increasing activity (see U.S. Patents 4,454,241 and 4,498,975); increasing gasoline selectivity (See U.S. Pat. No. 4,970,183); and increasing steam stability (see U.S. Pat. Nos. 4,765,884 and 4,873,211).

One concern regarding use of ZSM-5 additive, even with phosphorus stabilization, is that refiners fear dilution of the large-pore cracking catalyst by addition of large amounts of ZSM-5, e.g., over 2 or 3 wt. % ZSM-5 crystal, or use of more than 5 or 10 wt. % additive, will seriously impair conversion since ZSM-5 has difficulty cracking the heavier molecules in gas oil feeds. Most refiners operate with significantly smaller amounts of ZSM-5 than the upper limits recited above.

Another concern is how well the unit will respond when pushed to make even more olefins. The consensus is that small amounts of ZSM-5 additive make large amounts of olefins in an FCC unit operating at low severity, but the increase in yields of light olefins attributable to ZSM-5 declines as severity increases. As reported in Elia, M.F. et al.,"Effect of Operation Conditions on the Behaviour of ZSM-5 Addition to a RE-USY FCC Catalyst", Applied Catalysis, 73, 195–216, 202 (1991), working at low severity produces an increase in light olefinic compounds, mostly branched, in the $C_5$–$C_6$ range. At the same time, an increase in light branched alkanes results and the aromatics and naphthenes contents are almost not affected. Elia et al. report that when the cracking occurs at higher temperatures, an increase in the $C_7$–$C_8$ aromatics and naphthenes is observed, but a much smaller increase in the lighter compounds results.

The poor response to unusually large concentrations of ZSM-5 was reported in U.S. Pat. No. 3,758,403, while Elia et al. have shown the unfavorable response of ZSM-5 to high severity FCC operation.

In summary, most refiners operating cracking units would prefer more light olefins, e.g., propylene and butylene. Based on the teachings of U.S. Pat. No. 3,758,403, use of ever increasing amounts of ZSM-5 and large-pore zeolite in a common particle produces rapidly diminishing returns from the incremental amounts of ZSM-5. Based on the state of the art on the use of separate additives in the catalytic cracking process, use of large amounts of additive comprising ZSM-5 would also produce diminishing returns at high severity. Today most refiners tend to use more severe operation to increase conversion, and improve gasoline yield and octane.

Based on the pyrolysis work reported in U.S. Pat. No. 4,980,053, use of large amounts of separate ZSM-5 additive at high severity reduces both conversion and gasoline yield, and would produce a highly aromatic gasoline.

Accordingly, it is an object of the present invention to provide an improved cracking process using an improved additive catalyst.

It is a further object of the invention to provide for the use of an improved additive catalyst composition to impart an octane-enhancing property in the present catalytic cracking process, and to enhance production of light olefins, e.g., propylene.

It is a particular object of the invention to provide for the use of an improved additive catalyst composition in hydrocarbon cracking to result in product rich in high octane gasoline, alkylate, gasoline plus potential alkylate, and petrochemical grade lower olefins, e.g., propylene.

SUMMARY OF THE INVENTION

These and other objects are achieved by the present invention which provides a process for converting feedstock hydrocarbon compounds to product hydrocarbon compounds of lower molecular weight than the feedstock hydrocarbon compounds which comprises contacting the feedstock at conversion conditions with catalyst comprising a large-pore molecular sieve and additive catalyst, the additive catalyst comprising an improved formulation of crystals having the structure of ZSM-5. More particularly, the invention provides a hydrocarbon cracking process which uses a catalyst composition comprising a large-pore molecular sieve, such as, for example, USY, REY or REUSY, and an additive catalyst comprising ZSM-5 having been synthesized and formulated in a special way to provide product significantly improved in gasoline quality, alkylate and potential alkylate quantity, and valuable lower olefin, e.g., propylene, quantity and selectivity.

The large-pore molecular sieve catalyst composition may be prepared by combining a slurry of the large-pore molecular sieve, e.g., USY, REY or REUSY, and a slurry comprising matrix material The combined slurries may be dewatered, reslurried, homogenized, and spray dried.

The additive catalyst composition will be prepared by 1) synthesizing crystals having the structure of ZSM-5 from a particular, critical reaction mixture; 2) recovering the specially synthesized ZSM-5 crystals; 3) ammonium exchanging the recovered ZSM-5; 4) deagglomerating and slurrying the ammonium-exchanged ZSM-5, such as by ball milling; 5) slurrying the ZSM-5 with matrix material, such as silica, alumina, silica-alumina, or clay and, if desired, phosphorus to make a ZSM-5/matrix composition; 6) drying the product ZSM-5/matrix composition, such as by spray drying to form a fluid powder; and 7) converting the dried ZSM-5/matrix composition to the protonic form. This conversion may be accomplished by, for example, acid treatment, ammonium exchange, and/or calcination. If acid treatment or ammonium exchange is performed, calcination will follow.

In the process for cracking a hydrocarbon feedstock, the feedstock is contacted under catalytic cracking conditions with a catalyst composition comprising a large-pore molecular sieve and the additive catalyst to yield the improved product. The additive catalyst provides up to about 6 wt. % ZSM-5 crystals, for example from about 0.01 wt. % to about 6 wt. % ZSM-5 crystals, preferably from about 0.3 wt. % to about 4.5 wt. %, based on total catalyst inventory.

Advantageously, the use of the present improved additive catalyst in the cracking process results in a high octane gasoline product, higher amounts of potential alkylate which can be subsequently processed to yield a high octane gasoline, and a dramatically increased amount of lower olefins, with selectivity for petrochemical grade propylene.

DETAILED DESCRIPTION

It has been found that the use of a minor amount of up to about 6 wt. %, e.g., from about 0.01 wt. % to about 6 wt. %, usually from about 0.3 wt. % to about 4.5 wt. % of total catalyst inventory of specially synthesized ZSM-5 crystal in an additive catalyst, prepared in a special way and having certain physical properties due to its manufacture, along with cracking catalyst in a fluidized-bed cracking process leads to an unexpected shift in product composition as compared with the same process using the cracking catalyst alone or with a different additive catalyst. The product gasoline fraction octane is essentially the same as provided by commercial ZSM-5 additives. However, the yield shift produced by the present process results in an increase in $C_3$ and $C_4$ olefins, especially propylene, which shift is valuable to the refiner.

In catalytic cracking, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. RON signifies the research octane number, MON signifies the motor octane number, and the terms are used to describe the knocking characteristics of gasoline, that is, its combustion behavior. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, alkylate and potential alkylate may result from the cracking process. This indirectly leads to product of increased octane because high octane, highly branched paraffinic gasoline blending stocks are produced principally by alkylation of $C_3$ and $C_4$ olefins with isobutane. Unlike cracking, alkylation makes larger branched hydrocarbons from smaller hydrocarbons and these larger branched hydrocarbons are inherently higher in octane.

The present process not only provides a high octane product and product alkylate and potential alkylate, but significantly more light olefins, especially propylene. The increase in propylene product at the expense of other olefins is an unexpected, very valuable occurrence. The propylene is high quality, petrochemical grade, and may be used for manufacture of valuable ethers and/or alcohols, or as an alkylating agent.

The presently required improved additive catalyst provides high selectivity to propylene as the light olefin product. In other respects, it provides comparable catalytic performance compared to the best of presently used ZSM-5 FCC additive catalysts. Further, the presently used improved additive catalyst provides catalyst usage improvements, such as ease of handling, loading, and processing, found desirable by refiners.

Feeds

The feedstock, that is, the hydrocarbons to be cracked, may include in whole or in part, a gas oil (e.g., light, medium, or heavy gas oil) having an initial boiling point above 204° C., a 50% point range of at least 260° C. and an end point range of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils with high metals contents can also be cracked using the invention.

Process

The present invention provides a process for converting feedstock hydrocarbon compounds to product hydrocarbon compounds of lower molecular weight than the feedstock hydrocarbon compounds. In particular, the present invention provides a process for catalytically cracking a hydrocarbon feed to a mixture of products comprising gasoline, alkylate, potential alkylate, and propylene in the presence of a cracking catalyst under catalytic cracking conditions. Catalytic cracking units which are amenable to the process of the invention operate at temperatures from about 200° C. to about 870° C. and under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 450° C. to about 510° C.; catalyst/oil volume ratio of from about 2 to about 7; reactor space velocity of from about 1 to about 2.5 vol./hr./vol.; and recycle to fresh feed ratio of from 0 to about 0.5 (volume).

The process of the invention is particularly applicable to Fluid Catalytic Cracking. In fluidized catalytic cracking processes, the catalyst is a fine powder of abut 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_3+$ and $C_2-$ fractions in the feed to the primary absorber. Primary absorber off-gas is directed to a secondary or sponge absorber, where a circulating stream of light cycle oil from the main column is used to absorb most of the remaining $C_5+$ material in the sponge absorber feed. Some $C_3$ and $C_4$ materials are also absorbed. The sponge-absorber rich oil is returned to the FCC main column. The sponge-absorber overhead, with most of the valuable $C_4+$ material removed but including $H_2S$, is sent to the fuel gas or other process streams.

Liquid from the high pressure separator is sent to a stripper where most of the $C_2-$ is removed overhead and sent back to the high pressure separator. The bottoms liquid from the stripper is sent to the debutanizer, where an olefinic $C_3-C_4$ product is further separated for gasoline production. The debutanizer bottoms, that is, the stabilized gasoline, is sent to treating, if necessary, and then to storage. The $C_3$ and $C_4$ product olefins can be directed to an alkylation unit to produce a high octane gasoline by the reaction of an iso-paraffin (usually iso-butane) with one or more of the low molecular weight olefins (usually propylene and butylene).

The FCC conversion conditions include a riser top temperature of from about 500° C. to about 595° C., preferably from about 520° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

Molecular Sieve Catalyst

The catalyst can contain any active component which has cracking activity. The active component may be a conventional large-pore molecular sieve including zeolite X (U.S. Pat. No. 2,882,442); REX; zeolite Y (U.S. Pat. No. 3,130,007); Ultrastable Y zeolite (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. No. 3,442,792; U.S. Pat. No. 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. Zeolite ZSM-20 (U.S. Pat. No. 3,972,983); zeolite Beta (U.S. Pat. No. 3,308,069); zeolite L (U.S. Pat. Nos. 3,216,789; and 4,701,315); and naturally occurring zeolites such as faujasite, mordenite and the like may also be used. These materials may be subjected to conventional treatments, such as impregnation or ion exchange with rare earths to increase stability. These patents are incorporated herein by reference. These large-pore molecular sieves have a pore opening of greater than about 7 Angstroms. In current commercial practice most cracking catalysts contain these large-pore molecular sieves. The preferred molecular sieve of those listed above is a zeolite Y, more preferably an REY, USY or REUSY.

Other large-pore crystalline molecular sieves include pillared silicates and/or clays; aluminophosphates, e.g., ALPO$_4$-5, ALPO$_4$-8, VPI-5; silicoaluminophosphates, e.g., SAPO-5, SAPO-37, SAPO-31, SAPO-40; and other metal aluminophosphates. These are variously described in U.S. Pat. Nos. 4,310,440; 4,440,871; 4,554,143; 4,567,029; 4,666,875; 4,742,033; 4,880,611; 4,859,314; and 4,791,083, each incorporated herein by reference.

The preparation of some molecular sieve-containing catalysts may require reduction of the sodium content, as well as conversion to the acid (protonated) form. For example, with zeolites this can be accomplished by employing the procedure of converting the zeolite to an intermediate ammonium form as a result of ammonium ion exchange followed by calcination to provide the hydrogen form. The operational requirements of these procedures are well known in the art.

The source of the ammonium ion is not critical; thus the source can be ammonium hydroxide or an ammonium salt such as ammonium nitrate, ammonium sulfate, ammonium chloride and mixtures thereof. These reagents are usually in aqueous solutions. By way of illustration, aqueous solutions of 1N NH$_4$OH, 1N NH$_4$NO$_3$, 1N NH$_4$Cl, and 1N NH$_4$Cl/NH$_4$OH have been used to effect ammonium ion exchange. The pH of the ion exchange is not critical but is generally maintained at 7 to 12. Ammonium exchange may be conducted for a period of time ranging from about 0.5 to about 20 hours at a temperature ranging from ambient up to about 100° C. The ion exchange may be conducted in a single stage or in multiple stages. Calcination of the ammonium exchanged zeolite will produce its acid form. Calcination can be effected at temperatures up to about 550° C.

The molecular sieve catalyst may include phosphorus or a phosphorus compound for any of the functions generally attributed thereto, such as, for example, attrition resistance, stability, metals passivation, and coke make reduction.

To prepare the catalyst for use herein, a slurry may be formed by deagglomerating the molecular sieve, preferably in an aqueous solution. The slurry of the matrix material may be formed by mixing the desired matrix components such as clay and/or inorganic oxide in an aqueous solution. The molecular sieve slurry and the matrix slurry are then well mixed and spray dried to form catalyst particles of, for example, less than 200 microns in diameter.

Additive Catalyst

It is conventional to use an additive catalyst with different properties along with the conventional catalyst to form an optional mixed catalyst system. Commercially used additives are shape-selective zeolites. Zeolites having a Constraint Index of 1-12 can be used for this purpose. Details of the Constraint Index test are provided in *J. Catalysis*, 67, 218-222 (1981) and in U.S. Pat. No. 4,711,710 both of which are incorporated herein by reference.

Conventional shape-selective zeolites useful for this purpose are exemplified by intermediate pore (e.g., less than about 7 Angstroms pore size, such as from about 5 to less than about 7 Angstroms) zeolites ZSM-5 (U.S. Pat. No. 3,702,886 and Re. 29,948): ZSM-11 (U.S. Pat. No. 3,709,979): ZSM-12 (U.S. Pat. No. 4,832,449): ZSM-22 (U.S. Pat. No. 4,556,477): ZSM-23 (U.S. Pat. No. 4,076,842): ZSM-35 (U.S. Pat. No. 4,016,245); ZSM-48 (U.S. Pat. No. 4,397,827); ZSM-57 (U.S. Pat. No. 4,046,685); PSH-3 (U.S. Pat. No. 4,439,409); and MCM-22 (U.S. Pat. No. 4,954,325) either alone or in combination. In addition, the catalyst composition may include metals useful in promoting the oxidation of carbon monoxide to carbon dioxide under regenerator conditions as described in U.S. Pat. No. 4,350,614. The additive catalyst may also include phosphorus or a phosphorus compound for any of the functions generally attributed thereto.

The additive catalyst required for the present, improved process is synthesized and formulated in a very special way to provide certain physical properties. The crystal component of the additive catalyst has the structure of ZSM-5, a silica/alumina mole ratio of less than about 30, usually from about 20 to less than about 30, and a high as-synthesized alkali and/or alkaline earth metal to silica molar ratio. The as-synthesized crystal has a formula, on an anhydrous basis and in terms of y moles of $SiO_2$, as follows:

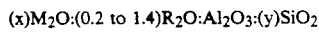

$$(x)M_2O:(0.2 \text{ to } 1.4)R_2O:Al_2O_3:(y)SiO_2$$

wherein x is greater than about 0.1, usually greater than about 0.3, most often from greater than about 0.4 to about 1.4, and y is less than about 30, usually from about 20 to less than about 30, more usually from about 23 to less than about 30. The M and R components are associated with the material as a result of their presence during crystallization, described in more detail below, and may be reduced or removed by post-crystallization methods herein more particularly described.

The synthesis of this special ZSM-5 crystalline material requires forming a reaction mixture hydrogel having a pH of from about 10 to about 14, preferably from about 11.5 to about 13.5, and containing sources of alkali or alkaline earth metal (M) cations; an oxide of aluminum; an oxide of silicon; n-propylamine directing agent (R); and water, said reaction mixture having a composition in terms of mole ratios, within the following ranges:

| Reactants | Useful | Preferred |
|---|---|---|
| $SiO_2/Al_2O_3$ | <40 | 20 to 35 |
| $H_2O/SiO_2$ | 10 to 35 | 10 to 30 |
| $OH^-/SiO_2$ | 0.1 to 0.3 | 0.1 to 0.2 |
| $M/SiO_2$ | 0.2 to 0.6 | 0.3 to 0.5 |
| $R/SiO_2$ | 0.01 to 0.6 | 0.02 to 0.3 |

The reaction is maintained until crystals of the ZSM-5 structure are formed. Reaction conditions required consist of heating the foregoing reaction mixture to a temperature of from about 100° C. to about 200° C. for a period of time of from about 10 hours to about 100 hours. A more preferred temperature range is from about 130° C. to about 180° C. with the amount of time at a temperature in such range being from about 20 hours to about 60 hours. The solid product comprising ZSM-5 crystals is recovered from the reaction medium, as by cooling the whole to room temperature, filtering, and water washing.

The additive catalyst comprising this specially prepared ZSM-5 for use herein is prepared as follows:

The recovered ZSM-5 crystals are ammonium exchanged such as by contact with, for example, ammonium nitrate, sulfate, hydroxide, or halide, e.g., chloride, solution. The exchanged crystals may then be washed with, for example, deionized water, and dried.

The ion-exchanged crystalline material is then deagglomerated. This may be accomplished by ball milling an aqueous slurry of the zeolite crystals.

The deagglomerated crystalline ZSM-5 material is the slurried with matrix material such as, for example, silica, clay and/or alumina, at a pH of from about 2 to about 12, preferably from about 4 to about 6 to yield a ZSM-5/matrix material composition comprising from about 5 to about 80 wt. % ZSM-5 and from about 20 to about 95 wt. % matrix. Phosphorus compounds, e.g., phosphoric acid, may be added to the composition in this step of the manufacture such that elemental phosphorus comprises from about 1.5 to about 5.5 wt. % of the matrix of the product material.

The final ZSM-5/matrix slurry is then dried, such as by spray drying to form a fluid powder, at a temperature of, for example, from about 65° C. to about 315° C.

This dried ZSM-5/matrix composition is then converted to the protonic form having an Alpha Value of greater than about 30. This conversion may be accomplished by, for example, acid treatment, ammonium exchange, and/or calcination. If acid treatment or ammonium exchange is performed, calcination will follow.

Acid treatment for this purpose comprises, for example, contacting the dried ZSM-5/matrix composition with a 0.1 to about 1 N mineral acid such as, for example, hydrochloric acid, or a carboxylic or dicarboxylic acid such as, for example, oxalic acid, at room temperature or a temperature up to about 150° C. The acid treated composition may be washed with, for example, deionized water and again dried at a temperature of, for example, from about 65° C. to about 315° C.

Ammonium exchange for this purpose comprises, for example, contacting the dried ZSM-5/matrix composition with ammonium nitrate, sulfate, hydroxide, and/or halide solution, washing the exchanged catalyst material with, for example, deionized water, and again drying the product catalyst material at a temperature of, for example, from about 65° C. to about 315° C.

The dried ZSM-5/matrix composition, whether acid treated or ammonium exchanged or not, is then calcined at a temperature of from about 200° C. to about 550° C. for from about 1 minute to about 48 hours. The calcined ZSM-5/matrix catalyst will have an Alpha Value of greater than about 30, usually from greater than about 30 to about 1200. A preferred calcination procedure in accordance herewith would be to provide a calcined product catalyst which retains a trace amount of carbon residue. Therefore, partial calcination within the above conditions, e.g., at lower temperature and/or shorter time, is preferred.

Optionally, although not necessary nor, in fact, preferred, for the process of this invention, the calcined catalyst material may be subjected to steaming in an atmosphere of from about 5 to about 100% steam for at least about 1 hour, e.g., from about 1 hour to about 200 hours, at a temperature of at least about 300° C., e.g., from about 300° C. to about 800° C. The resulting steamed catalyst will have an Alpha Value of from about 1 to about 10.

Matrix

The matrix, i.e., binder, materials used are resistant to the temperatures and other conditions e.g., mechanical attrition, which occur in various hydrocarbon conversion processes such as cracking. It is generally necessary that the catalysts be resistant to mechanical attrition, that is, the formation of fines which are small particles, e.g., less than 20 μm. The cycles of cracking and regeneration at high flow rates and temperatures, such as in an FCC process, have a tendency to break down the catalyst into fines, as compared with an average diameter of catalyst particles of about 60–90 microns. In an FCC process, catalyst particles range from about 10 to about 200 microns, preferably from about 20 to 120 microns. Excessive generation of catalyst fines increases the refiner's catalyst costs.

The matrix may fulfill both physical and catalytic functions. Matrix materials include active or inactive inorganic materials such as clays, and/or metal oxides such as alumina or silica, titania, zirconia, or magnesia. The metal oxides may be in the form of a gelatinous precipitate or gel.

Use of an active matrix material in conjunction with the molecular sieve component that is combined therewith, may enhance the conversion and/or selectivity of the overall catalyst composition in certain hydrocarbon conversion processes. Inactive materials may serve as diluents to control the amount of conversion in a given process so that products can be obtained economically and in an orderly fashion without employing other means for controlling the rate of reaction. These materials may be incorporated as naturally occurring clays to improve the attrition resistance of the catalyst under commercial operating conditions.

Naturally occurring clays which can be composited with the catalyst include the montmorillonite and kaolin families which include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, catalysts can be composited with a porous matrix material such as silica-alumina, silica-magnesia, silica-zirconia, silica-thoria, silica-beryllia, silica-titania, as well as ternary materials such as silica-alumina-thoria, silica-alumina-zirconia, silica-alumina-magnesia, silica-magnesia-zirconia. The matrix can be in the form of a cogel. A mixture of these components can also be used.

In general, the relative proportions of finely divided, crystalline molecular sieve component and inorganic oxide gel matrix vary widely, with the molecular sieve content ranging from about 1 to about 90 percent by weight, and more usually from about 2 to about 80 weight percent of the composite.

The large-pore molecular sieve material may comprise from about 10 to about 80 weight percent of the catalyst composition. For the additive catalyst, the specially synthesized ZSM-5 may comprise from about 1 to about 50 weight percent of the additive catalyst composition.

Although neither the cracking catalyst nor the additive catalyst need be steamed prior to use in the present process, and, in fact, are preferably not steamed prior to use herein, they may be steamed at a temperature of from about 300° C. to about 800° C. for a time of from about 1 to about 200 hours in about 5 to about 100% steam.

In order to more fully illustrate the nature of the invention and the manner of practicing same, the following examples are presented. In the examples, whenever adsorption data are set forth for comparison of sorptive capacities for water, cyclohexane and n-hexane, they are determined as follows:

A weighed sample of the calcined adsorbant is contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure is kept constant (within about ±0.5 mm) by addition of absorbate vapor controlled by a manostat during the adsorption period, which does not exceed about 8 hours. As adsorbate is adsorbed by the sorbant material, the decrease in pressure causes the manostat to open a valve which admits more adsorbate vapor to the chamber to restore the above control pressures. Sorption is complete when the pressure change is not sufficient to activate the manostat. The increase in weight is calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395.

EXAMPLE 1

A solution containing 1.53 parts 50% NaOH solution in 1.89 parts H$_2$O was added to a solution containing 1 part Al$_2$(SO$_4$)$_3$·xH$_2$O(17.2% Al$_2$O$_3$) in 7.63 parts H$_2$O. To this mixture was added 3.38 parts Ultrasil (VN3SP) precipitated silica and 0.09 part ZSM-5 seeds followed by 0.39 part n-propylamine. The Ultrasil used is a precipitated, spray-dried silica manufactured by DeGussa Corporation containing about 90 wt. % SiO$_2$. The mixture was stirred until uniform. The reaction mixture had the following composition in mole ratios:

| | |
|---|---|
| SiO$_2$/Al$_2$O$_3$ | = 30.0 |
| OH$^-$/SiO$_2$ | = 0.18 |
| R/SiO$_2$ | = 0.13 |
| H$_2$O/SiO$_2$ | = 13.3 |
| Na$^+$/SiO$_2$ | = 0.38 |
| % solids | = 18.0 | where R=n-propylamine.

The mixture was crystallized in a stirred reactor at 160° C. for 26 hours. The crystals were filtered, washed with water, and dried at 120° C. A portion of the product was submitted for X-ray analysis and identified as having the structure of ZSM-5.

The chemical composition of the product crystalline material was, in wt. %:

| N | = 1.3 |
|---|---|
| Na | = 1.2 |
| $Al_2O_3$ | = 5.5 |
| $SiO_2$ | = 72.3 |
| Ash (1000° C.) | = 88.4 |
| $SiO_2/Al_2O_3$, molar | = 22.3 |
| Carbon | = 4.2 |

The sorption capacities and surface area, after calcining the product crystalline material for 16 hours at 538° C., were determined to be:

| Cyclohexane, 40 Torr, wt. % | = 7.6 |
|---|---|
| n-Hexane, 40 Torr, wt. % | = 11.4 |
| $H_2O$, 12 Torr, wt. % | = 9.2 |
| Surface Area, $m^2/g$ | = 286 |

SEM analysis of the product material revealed a polycrystalline solid showing crystal facets of ZSM-5.

A calcined (3 hours at 538° C. in air) portion of the product of this example was ammonium exchanged with 10% $NH_4Cl$ solution to a sodium level of 34 ppm and calcined again to obtain the hydrogen form. The Alpha Value of this material was 1200.

EXAMPLE 2

For comparison purposes, ZSM-5 crystals used commercially for additive catalyst were synthesized. In that synthesis, a solution containing 1.28 parts 50 % NaOH solution in 8.49 parts $H_2O$ was added to a solution containing 1 part $Al_2(SO_4)_3 \cdot xH_2O$ 47% solution (8.1 wt. % $Al_2O_3$). To this mixture was added 5.24 parts Ultrasil (VN3SP) precipitated silica, 0.04 part ZSM-5 seeds, 0.008 part Daxad-23, and 0.72 part 26 % brine solution, followed by 0.46 part n-propylamine. The mixture was stirred until uniform. The reaction mixture had the following composition in mole ratios:

| $SiO_2/Al_2O_3$ | = 78.2 |
|---|---|
| $OH^-/SiO_2$ | = 0.07 |
| $R/SiO_2$ | = 0.10 |
| $H_2O/SiO_2$ | = 6.8 |
| $Na^+/SiO_2$ | = 0.26 |
| % solids | = 28.4 | where R=n-propylamine.

The mixture was crystallized in a stirred reactor at 149° C. for 7 hours. The crystals were filtered, washed with water, and dried at 120° C. A portion of the product was submitted for X-ray analysis and identified as having the structure of ZSM-5.

The chemical composition of the product crystalline material was, in wt. %:

| Na | = <0.5 |
|---|---|
| $Al_2O_3$ | = 5.3 |
| $SiO_2$ | = 83.7 |
| Ash (1000° C.) | = 89 |

| $SiO_2/Al_2O_3$, molar | = 55 |
|---|---|

The surface area of this material was determined to be 340 $m^2/g$.

A calcined portion of the product of this example was ammonium exchanged with 1N $NH_4NO_3$ to a sodium level of 121 ppm. The Alpha Value of this material was 800.

EXAMPLE 3

Again for comparison purposes, another ZSM-5 material used commercially for additive catalyst was synthesized. In that synthesis, a solution containing 1.54 parts 50 % NaOH solution was added to a solution containing 1 part $Al_2(SO_4)_3 \cdot xH_2O$ (17.2% $Al_2O_3$) in 10.1 parts $H_2O$. To this mixture was added 3.43 parts Ultrasil (VN3SP) precipitated silica. The mixture was stirred until uniform. The reaction mixture had the following composition in mole ratios:

| $SiO_2/Al_2O_3$ | = 32.7 |
|---|---|
| $OH^-/SiO_2$ | = 0.17 |
| $R/SiO_2$ | = 0 |
| $H_2O/SiO_2$ | = 11.0 |
| $Na^+/SiO_2$ | = 0.35 |
| % solids | = 21.0 |

The mixture was crystallized in a stirred reactor at 160° C. for about 24 hours. The crystals were filtered, washed with water, and dried at 120° C. A portion of the product was submitted for X-ray analysis and identified as having the structure of ZSM-5.

The chemical composition of the product crystalline material was:

| Na | = 1358 ppm |
|---|---|
| $Al_2O_3$ | = 10.4 wt. % |
| $SiO_2$ | = 84.7 wt. % |
| Ash (1000° C.) | = 95.1 wt. % |
| Carbon | = 0 |
| $SiO_2/Al_2O_3$, molar | = 26 |

The surface area of the product material was determined to be 340 $m^2/g$.

A portion of the product of this example was ammonium exchanged with 1N $NH_4NO_3$ to a sodium level of 656 ppm. The Alpha Value of this material was 1361.

EXAMPLE 4

Another ZSM-5 material useful for commercial additive catalyst was synthesized for comparison purposes. A solution containing 0.72 part 50% NaOH solution in 4.15 parts $H_2O$ was added to a solution containing 1 part $AL_2(SO_4)_3 \cdot xH_2O$ 47% solution (8.1% $Al_2O_3$). To this mixture was added 1.63 parts HiSil-233 precipitated hydrated silica manufactured by PPG Industries containing about 87 wt. % $SiO_2$, about 6 wt. % free $H_2O$, and about 4.5 wt. % bound $H_2O$ of hydration. The mixture was stirred until uniform. The reaction mixture had the following composition in mole ratios:

| $SiO_2/Al_2O_3$ | = 27.0 |
|---|---|
| $OH^-/SiO_2$ | = 0.18 |
| $R/SiO_2$ | = 0 |
| $H_2O/SiO_2$ | = 10.0 |
| $Na^+/SiO_2$ | = 0.40 |

% solids = 26.7

The mixture was crystallized in a stirred reactor at 160° C. for 46 hours. The crystals were filtered, washed with water, and dried at 120° C. A portion of the product was submitted for X-ray analysis and identified as having the structure of ZSM-5.

The chemical composition of the product crystalline material was, in wt. %:

| | |
|---|---|
| Na | = 2.6 |
| $Al_2O_3$ | = 6.2 |
| $SiO_2$ | = 83.6 |
| Ash (1000° C.) | = 92.5 |
| $SiO_2/Al_2O_3$, molar | = 26 |

The surface area of this material was determined to be 299 m²/g.

A portion of the product of this example was ammonium exchanged with 1N $NH_4NO_3$ to a sodium level of 384 ppm. The Alpha Value of this material was 850.

EXAMPLE 5

Additive catalysts were prepared using the products of Examples 1, 2, 3, and 4. An additional additive catalyst was prepared using the product of a repeat of Example 3 (hereinafter 3'), except that the initial sodium content of the synthesis product was 2.7 wt. %, and the product of ammonium exchange with 1N $NH_4NO_3$ had a sodium level of 0.15 wt. %. As-synthesized portions of the zeolite products were ammonium exchanged with 1N $NH_4NO_3$, washed with deionized water, and dried at 120° C. to form drycake. A 30 wt. % solids slurry of each drycake was ball-milled to reduce mean particle size in each instance to about 2.3–3.6 μm.

The milled slurries were combined with silica-alumina and clay matrix to form 25 wt. % ZSM-5 fluid catalysts. The matrix in each case contained 35 wt. % Kaopaque 10S kaolin clay and 65 wt. % silica-alumina gel. The gel contained 93 wt. % silica from Q-Brand sodium silicate and 7 wt. % alumina from aluminum sulfate. The gel was formed at 10° to 13° C. at 8.6 wt. % solids. Sixty-five percent of the sodium in the sodium silicate was neutralized with sulfuric acid added to the slurries.

After spray drying at an average outlet temperature of 179° C., the catalysts were ammonium exchanged to remove sodium introduced by the matrix.

Small portions of each catalyst were calcined in a muffle furnace in air at 538° C. for 2 hours to obtain samples which were submitted for determination of analytical properties and Alpha Values. The remainder of each catalyst was steamed for 10 hours at 788° C. with 45% steam and 55% air at atmospheric pressure. Samples of the steamed catalysts were also submitted for determination of analytical properties and Alpha Values. Results of these tests are presented in Table 1.

TABLE 1

Comparison of Catalyst Properties

| | Zeolite Example | | | | |
|---|---|---|---|---|---|
| | 1 | 2 | 3 | 3' | 4 |
| | Calcined Catalyst | | | | |
| Sodium, ppm | 57 | 128 | 93 | 170 | 131 |
| Sorptions, g/100 g | | | | | |
| Water | 11.3 | NA | 6.6 | NA | 8.2 |
| n-$C_6$ | 8.5 | NA | 10.2 | NA | 9.7 |
| cy-$C_6$ | 8.2 | NA | 9.6 | NA | 9.3 |
| Real Density, g/cc | 2.26 | 2.36 | 2.36 | NA | 2.37 |
| Particle Density, g/cc | 1.29 | 1.18 | 1.15 | NA | 1.11 |
| Pore Volume, cc/g | 0.33 | 0.43 | 0.44 | NA | 0.48 |
| Surface Area, m²/g | 263 | 298 | 273 | NA | 275 |
| Alpha Value | 303 | 85 | 140 | NA | 53 |
| | Steam Deactivated Catalyst | | | | |
| Sorptions, g/100 g | | | | | |
| Water | 1.4 | NA | NA | NA | 1.2 |
| n-$C_6$ | 2.9 | NA | 2.7 | NA | 2.6 |
| cy-$C_6$ | 3.5 | NA | 3.3 | NA | 2.9 |
| Real Density, g/cc | 2.36 | NA | 2.37 | NA | 2.37 |
| Particle Density, g/cc | 1.44 | NA | 1.29 | NA | 1.23 |
| Pore Volume, cc/g | 0.27 | NA | 0.35 | NA | 0.39 |
| Surface Area, m²/g | 73 | NA | 98 | NA | 84 |
| Alpha Value | 3 | NA | 3 | 2 | 3 |

EXAMPLE 6

Cracking catalyst blends were prepared by mixing a commercial cracking catalyst composed of 15 wt. % REY and 85 wt. % silica-based matrix with each of the additive catalysts prepared in Example 5. Catalysts A and E are used in the present improved process. The other catalysts are commercially available. Catalyst I was made using as additive catalyst a commercially available material comprising 25 wt. % ZSM-5 as prepared in Example 2. Catalyst I was steamed 10 hours at 788° C. with 100% steam at 6 psig. The mixed catalysts were as follows:

| Catalyst | Wt. % Additive | Wt. % ZSM-5 | From Example |
|---|---|---|---|
| A | 8 | 2 | 1 |
| B | 8 | 2 | 2 |
| C | 8 | 2 | 3 |
| C' | 8 | 2 | 3' |
| D | 8 | 2 | 4 |
| E | 2 | 0.5 | 1 |
| F | 2 | 0.5 | 2 |
| G | 2 | 0.5 | 3 |
| H | 2 | 0.5 | 4 |
| I | 2 | 0.5 | Commercial |

EXAMPLE 7

The commercial REY cracking catalyst used in Example 6 and additive catalyst/cracking catalyst mixtures prepared in Example 6 were evaluated in a fixed-fluidized bed cracking unit with Joliet Sour Heavy Gas Oil feedstock at 515° C. and 1 minute on stream. The catalyst/oil ratios of the tests were varied through a range of from 3 to 6 to provide a range of conversions. Results of these tests at 70 % conversion are presented in Table 2 for the REY catalyst and Catalysts A, C, and D. Table 4 presents the test results for the REY catalyst and Catalysts E and I. Tables 3 and 5 present selectivity and activity comparisons between the catalysts. These test results indicate that the present process with catalysts A and E provides more alkylate, more gasoline plus potential alkylate, and selectively more propylene than the process using the other catalysts.

TABLE 2

(70 vol. % Conversion)

| | REY | Catalyst ← Δ → | | |
|---|---|---|---|---|
| | | C | D | A |
| $C_5+$ Gasoline, vol. % | 52.4 | (4.0) | (4.4) | (6.2) |
| $C_4$s, vol. % | 14.4 | 2.4 | 3.0 | 0.6 |
| $C_3$s, vol. % | 10.4 | 1.4 | 1.5 | 5.0 |
| $C_2-$, wt. % | 3.3 | (0.2) | (0.4) | 0.5 |
| Coke, wt. % | 7.1 | 0.9 | 1.1 | 0.5 |
| Alkylate, vol. % | 20.8 | 5.4 | 4.9 | 8.0 |
| G + PA, vol. % | 73.2 | 1.4 | 0.5 | 1.8 |
| $n-C_5$, vol. % | 0.4 | (0.1) | (0.1) | (0.1) |
| $i-C_5$, vol. % | 6.6 | 0.1 | 0.6 | (1.2) |
| $C_5=$, vol. % | 3.8 | 0.1 | — | (0.3) |
| $n-C_4$, vol. % | 0.8 | 0.4 | 0.4 | 0.3 |
| $i-C_4$, vol. % | 8.2 | 0.4 | 1.1 | (0.2) |
| $C_4=$, vol. % | 5.5 | 1.6 | 1.4 | 0.5 |
| $C_3°$, vol % | 3.4 | (0.3) | (0.1) | 0.5 |
| $C_3=$, vol. % | 7.1 | 1.6 | 1.4 | 4.0 |
| $C_2$, wt. % | 0.6 | 0.1 | 0.1 | 0.2 |
| $C_2=$, wt. % | 0.8 | (0.1) | (0.2) | 0.1 |
| $C_1$, wt. % | 0.8 | — | — | — |
| $H_2$, wt. % | 0.2 | (0.1) | — | — |
| $H_2S$, wt. % | 0.9 | — | (0.3) | 0.3 |
| Octane, $C_5+$ Gasoline | 91.4 | 0.8 | 1.0 | 0.9 |

TABLE 3

(70 vol. % Conversion)

| | Catalyst | | |
|---|---|---|---|
| | C | D | A |
| Selectivity | | | |
| $(-\Delta C_5+$ Gasoline$/\Delta RON)$ | 5.0 | 4.4 | 6.9 |
| $(-\Delta C_5+$ Gasoline$/\Delta PA)$ | 0.7 | 0.9 | 0.8 |
| $C_3=/C_4=$ (vol. %/vol. %) | 1.2 | 1.2 | 1.9 |
| $\Delta C_3=/\Delta C_4=$ (vol. %/vol. %) | 1.0 | 1.0 | 8.0 |
| $C_3=/C_3°$ (vol. %/vol. %) | 2.8 | 2.6 | 2.9 |
| $\Delta C_3=/\Delta(C_3= + C_3°)$ | 1.2 | 1.1 | 0.9 |
| Activity | | | |
| $(\Delta RON/$wt. % ZSM-5$)$ | 0.4 | 0.5 | 0.5 |
| $(\Delta PA/$wt. % ZSM-5$)$ | 2.8 | 2.5 | 4.0 |

TABLE 4

(70 vol. % Conversion)

| | REY | Catalyst ← Δ → | |
|---|---|---|---|
| | | I | E |
| $C_5+$ Gasoline, vol. % | 52.4 | (2.1) | (3.2) |
| $C_4$s, vol. % | 14.4 | 0.8 | 0.2 |
| $C_3$s, vol. % | 10.4 | 0.3 | 2.1 |
| $C_2-$, wt. % | 3.3 | (0.2) | — |
| Coke, wt. % | 7.1 | 0.7 | 0.7 |
| Alkylate, vol. % | 20.8 | 1.1 | 3.8 |
| G + PA, vol. % | 73.2 | (1.0) | 0.5 |
| $n-C_5$, vol. % | 0.4 | — | (0.1) |
| $i-C_5$, vol. % | 6.6 | (1.1) | (1.1) |
| $C_5=$, vol. % | 3.8 | (0.3) | (0.1) |
| $n-C_4$, vol. % | 0.8 | 0.3 | 0.1 |
| $i-C_4$, vol. % | 8.2 | — | (0.4) |
| $C_4=$, vol. % | 5.5 | 0.4 | 0.5 |
| $C_3°$, vol. % | 3.4 | 0.1 | 0.2 |
| $C_3=$, vol. % | 7.1 | 0.1 | 1.8 |
| $C_2$, wt. % | 0.6 | 0.1 | — |
| $C_2=$, wt. % | 0.8 | (0.2) | — |
| $C_1$, wt. % | 0.8 | — | (0.1) |
| $H_2$, wt. % | 0.2 | — | — |
| $H_2S$, wt. % | 0.9 | (0.1) | — |
| Octane, $C_5+$ Gasoline | 91.4 | (0.4) | 0.3 |

TABLE 5

(70 vol. % Conversion)

| | Catalyst | |
|---|---|---|
| | I | E |
| Selectivity | | |
| $(-\Delta C_5+$ Gasoline$/\Delta RON)$ | (4.2) | 10.7 |
| $(-\Delta C_5+$ Gasoline$/\Delta PA)$ | 2.3 | 0.8 |
| $C_3=/C_4=$ (vol. %/vol. %) | 1.2 | 1.5 |
| $\Delta C_3=/\Delta C_4=$ (vol. %/vol. %) | 0.3 | 3.6 |
| $C_3=/C_3°$ (vol. %/vol. %) | 2.1 | 2.5 |
| $\Delta C_3=/\Delta(C_3= + C_3°)$ | 0.5 | 0.9 |
| Activity | | |
| $(\Delta RON/$wt. % ZSM-5$)$ | (0.3) | 0.2 |
| $(\Delta PA/$wt. % ZSM-5$)$ | 0.5 | 1.9 |

EXAMPLE 8

The evaluation tests of Example 7 are repeated here with Joliet Sour Heavy Gas Oil feedstock at 515° C. and 1 minute on stream. Results of these tests at 65 % conversion are presented in Table 6 for the REY catalyst and Catalysts A, B, and C'. Table 7 presents selectivity and activity comparisons between the catalysts.

TABLE 6

(65 vol. % Conversion)

| | REY | Catalyst ← Δ → | | |
|---|---|---|---|---|
| | | A | B | C' |
| $C_5+$ Gasoline, vol. % | 50.6 | (2.1) | (3.1) | (6.1) |
| $C_4$s, vol. % | 14.2 | — | 1.7 | 4.0 |
| $C_3$s, vol. % | 8.7 | 1.6 | 2.5 | 4.1 |
| $C_2-$, wt. % | 2.5 | (0.1) | 0.1 | 0.5 |
| Coke, wt. % | 4.5 | 0.5 | — | (0.2) |
| Alkylate, vol. % | 23.1 | 4.0 | 5.7 | 7.8 |
| G + PA, vol. % | 73.6 | 1.9 | 2.5 | 1.7 |
| $n-C_5$, vol. % | 0.4 | (0.1) | — | (0.1) |
| $i-C_5$, vol. % | 4.1 | (0.8) | 0.5 | 0.9 |
| $C_5=$, vol. % | 3.6 | — | 1.0 | 0.8 |
| $n-C_4$, vol. % | 1.0 | — | — | — |
| $i-C_4$, vol. % | 6.2 | (0.7) | 0.4 | 2.4 |
| $C_4=$, vol. % | 7.0 | 0.7 | 1.2 | 1.6 |
| $C_3°$, vol. % | 1.8 | (0.1) | 0.3 | 1.1 |
| $C_3=$, vol. % | 6.9 | 1.7 | 2.2 | 3.0 |
| $C_2$, wt. % | 0.5 | 0.1 | — | 0.1 |
| $C_2=$, wt. % | 0.5 | (0.1) | 0.1 | 0.1 |
| $C_1$, wt. % | 0.5 | (0.1) | 0.1 | 0.1 |
| $H_2$, wt. % | 0.2 | (0.1) | — | — |
| $H_2S$, wt. % | 0.8 | 0.1 | — | 0.2 |
| Octane, $C_5+$ Gasoline | 89.5 | — | 1.3 | 2.1 |

TABLE 7

(65 vol. % Conversion)

| | Catalyst | | |
|---|---|---|---|
| | A | B | C' |
| Selectivity | | | |
| $(-\Delta C_5+$ Gasoline$/\Delta RON)$ | — | 2.4 | 2.9 |
| $(-\Delta C_5+$ Gasoline$/\Delta PA)$ | 0.5 | 0.5 | 0.8 |
| $C_3=/C_4=$ (vol. %/vol. %) | 1.1 | 1.1 | 1.2 |
| $\Delta C_3=/\Delta C_4=$ (vol. %/vol. %) | 2.4 | 1.8 | 1.9 |
| $C_3=/C_3°$ (vol. %/vol. %) | 5.1 | 4.3 | 3.4 |
| $\Delta C_3=/\Delta(C_3= + C_3°)$ | 1.1 | 0.9 | 0.7 |
| Activity | | | |
| $(\Delta RON/$wt. % ZSM-5$)$ | — | 0.7 | 1.1 |
| $(\Delta PA/$wt. % ZSM-5$)$ | 2.0 | 2.9 | 3.9 |

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for converting feedstock hydrocarbon compounds to product hydrocarbon compounds having a lower molecular weight than the feedstock hydrocarbon compounds which comprises contacting said feedstock at catalytic cracking conversion conditions with a catalyst composition comprising a large-pore molecular sieve material having pore openings greater than about 7 Angstroms and an additive catalyst composition comprising crystalline material having the structure of ZSM-5 and a silica/alumina mole ratio of less than about 30, said crystalline material having, as-synthesized, a formula on an anhydrous basis

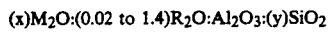

wherein x is a number greater than about 0.1, M is alkali or alkaline earth metal, R is n-propylamine, and y is a number less than about 30, said additive catalyst composition having an Alpha Value of greater than about 30.

2. The process of claim 1 wherein the large-pore molecular sieve material is selected from the group consisting of zeolites X, Y, REX, REY, USY, REUSY, dealuminated Y, ultra-hydrophobic Y, silicon-enriched dealuminated Y, ZSM-20, Beta, L, silicoaluminophosphates SAPO-5, SAPO-31, SAPO-37, SAPO-40, pillared silicates, pillared clays, and combinations thereof.

3. The process of claim 2 wherein the large pore molecular sieve material comprises REY, USY or REUSY.

4. The process of claim 1 wherein the catalyst composition and additive catalyst composition comprise matrix material selected from the group consisting of silica, alumina, titania, zirconia, magnesia, kaolin, bentonite, and combinations thereof.

5. The process of claim 1 wherein the catalyst composition comprises up to about 6 wt. % of the crystalline material having the structure of ZSM-5.

6. The process of claim 1 wherein the additive catalyst composition comprises from about 5 wt. % to about 80 wt. % of the crystalline material having the structure of ZSM-5 and from about 20 wt. % to about 95 wt. % matrix.

7. The process of claim 6 wherein the additive catalyst composition comprises from about 1.5 wt. % to about 5.5 wt. % elemental phosphorus based on weight of matrix.

8. The process of claim 1 wherein the additive catalyst composition has been synthesized by a method comprising:

(i) forming a reaction mixture hydrogel having a pH of from about 10 to about 14, and containing sources of alkali or alkaline earth metal (M) cations; an oxide of aluminum; an oxide of silicon; n-propylamine directing agent (R); and water, said reaction mixture having a composition in terms of mole ratios, within the following ranges:

| | |
|---|---|
| SiO$_2$/Al$_2$O$_3$ | <40 |
| H$_2$O/SiO$_2$ | 10 to 35 |
| OH$^-$/SiO$_2$ | 0.1 to 0.3 |
| M/SiO$_2$ | 0.2 to 0.6 |
| R/SiO$_2$ | 0.01 to 0.6 |

(ii) maintaining the reaction mixture until the crystals of ZSM-5 structure are formed,
(iii) recovering the ZSM-5 crystals from the reaction mixture,
(iv) ammonium exchanging the recovered ZSM-5 crystals,
(v) deagglomerating the ammonium-exchanged crystals,
(vi) slurrying a matrix material with the deagglomerated ZSM-5 crystals at a pH of from about 2 to about 12, to yield a ZSM-5/matrix material comprising from about 5 to about 80 wt. % ZSM-5 and from about 20 to about 95 wt. % matrix,
(vii) drying the ZSM-5/matrix material, and
(viii) converting the dried ZSM-5/matrix material to the protonic form having an Alpha Value of greater than about 30.

9. The process of claim 8 wherein said step (viii) comprises steps of (1) contacting the dried ZSM-5/matrix material with mineral, carboxylic, or dicarboxylic acid, and (2) calcining the acid treated ZSM-5/matrix material at a temperature of from about 200° C. to about 550° C. for from about 1 minute to about 48 hours.

10. The process of claim 8 wherein said step (viii) comprises steps of (1) ammonium exchanging the dried ZSM-5/matrix material, and (2) calcining the ammonium exchanged ZSM-5/matrix at a temperature of from about 200° C. to about 550° C. for from about 1 minute to about 48 hours.

11. The process of claim 8 wherein said step (viii) comprises calcining the dried ZSM-5/matrix material at a temperature of from about 200° C. to about 550° C. for from about 1 minute to about 48 hours.

12. The process of claim 1 wherein said conversion conditions include an average reactor temperature of from about 450° C. to about 510° C., a catalyst/oil volume ratio of from about 2 to about 7, and a space velocity of from about 1 to about 2.5.

13. The process of claim 8 wherein said conversion conditions include an average reactor temperature of from about 450° C. to about 510° C., a catalyst/oil volume ratio of from about 2 to about 7, and a space velocity of from about 1 to about 2.5.

14. The process of claim 1 wherein said conversion conditions include a riser top temperature of from about 500° C. to about 595° C., a catalyst/oil weight ratio of from about 3 to about 12, and a catalyst residence time of from about 0.5 to about 15 seconds.

15. The process of claim 8 wherein said conversion conditions include a riser top temperature of from about 500° C. to about 595° C., a catalyst/oil weight ratio of from about 3 to about 12, and a catalyst residence time of from about 0.5 to about 15 seconds.

16. A process for cracking feedstock hydrocarbon compounds to product comprising gasoline, alkylate, potential alkylate and propylene which comprises contacting said feedstock at cracking conditions including a temperature of from about 200° C. to about 870° C. with a catalyst composition comprising a large-pore molecular sieve material having pore openings greater than about 7 Angstroms and an additive catalyst composition comprising crystalline material having the structure of ZSM-5 and a silica/alumina mole ratio of less than about 30, said crystalline material having, as-synthesized, a formula on an anhydrous basis

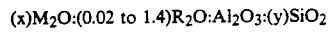

wherein x is a number greater than about 0.1, M is alkali or alkaline earth metal, R is n-propylamine, and y is a number less than about 30, said additive catalyst composition having an Alpha Value of greater than about 30.

17. The process of claim 16 wherein the large pore molecular sieve material comprises REY, USY or REUSY.

18. The process of claim 16 wherein the catalyst composition and additive catalyst composition comprise matrix material selected from the group consisting of silica, alumina, titania, zirconia, magnesia, kaolin, bentonite, and combinations thereof.

19. The process of claim 16 wherein the catalyst composition comprises up to about 6 wt. % of the crystalline material having the structure of ZSM-5.

20. The process of claim 16 wherein the additive catalyst composition comprises from about 5 wt. % to about 80 wt. % of the crystalline material having the structure of ZSM-5 and from about 20 wt. % to about 95 wt. % matrix.

21. The process of claim 20 wherein the additive catalyst composition comprises from about 1.5 wt. % to about 5.5 wt. % elemental phosphorus based on weight of matrix.

22. The process of claim 16 wherein the additive catalyst composition has been synthesized by a method comprising:
(i) forming a reaction mixture hydrogel having a pH of from about 10 to about 14, and containing sources of alkali or alkaline earth metal (M) cations; an oxide of aluminum; an oxide of silicon; n-propylamine directing agent (R); and water, said reaction mixture having a composition in terms of mole ratios, within the following ranges:

| | |
|---|---|
| $SiO_2/Al_2O_3$ | <40 |
| $H_2O/SiO_2$ | 10 to 35 |
| $OH^-/SiO_2$ | 0.1 to 0.3 |
| $M/SiO_2$ | 0.2 to 0.6 |
| $R/SiO_2$ | 0.01 to 0.6 |

(ii) maintaining the reaction mixture until the crystals of ZSM-5 structure are formed,
(iii) recovering the ZSM-5 crystals from the reaction mixture,
(iv) ammonium exchanging the recovered ZSM-5 crystals,
(v) deagglomerating the ammonium-exchanged crystals,
(vi) slurrying a matrix material with the deagglomerated ZSM-5/crystals at a pH of from about 2 to about 12, to yield a ZSM-5 matrix material comprising from about 5 to about 80 wt. % ZSM-5 and from about 20 to about 95 wt. % matrix,
(vii) drying the ZSM-5/matrix material, and
(viii) converting the dried ZSM-5/matrix material to the protonic form having an Alpha Value of greater than about 30.

* * * * *